(12) United States Patent  
Itoo et al.

(10) Patent No.: US 9,341,256 B2  
(45) Date of Patent: May 17, 2016

(54) SPEED CHANGE APPARATUS OF VEHICLE

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 147 days.

(21) Appl. No.: 14/261,646

(22) Filed: Apr. 25, 2014

(65) Prior Publication Data

US 2015/0308563 A1  Oct. 29, 2015

(51) Int. Cl.
| | |
|---|---|
| *B60K 20/00* | (2006.01) |
| *G05G 5/00* | (2006.01) |
| *F16H 59/02* | (2006.01) |
| *B60K 23/00* | (2006.01) |
| *F16H 63/38* | (2006.01) |
| *G05G 5/06* | (2006.01) |

(52) U.S. Cl.
CPC ............... *F16H 59/02* (2013.01); *B60K 23/00* (2013.01); *F16H 63/38* (2013.01); *G05G 5/065* (2013.01)

(58) Field of Classification Search
CPC . F16H 63/36; F16H 63/38; F16H 2063/3076; F16H 2063/3079; F16H 63/04; F16H 63/204; F16H 63/22; F16H 59/02; G05G 5/065
USPC ........ 74/473.21, 473.25, 473.36, 473.37, 527
See application file for complete search history.

(56) References Cited

U.S. PATENT DOCUMENTS

| | | | | |
|---|---|---|---|---|
| 4,016,773 A | * | 4/1977 | Galas | F16H 3/385 74/333 |
| 4,335,623 A | * | 6/1982 | Kronstadt | F16H 63/20 74/473.21 |
| 4,503,727 A | * | 3/1985 | Ballendux | F16H 63/16 475/209 |
| 2005/0223835 A1 | * | 10/2005 | Wang | F16H 59/105 74/473.18 |
| 2006/0060018 A1 | | 3/2006 | Miyazaki et al. | |
| 2007/0151384 A1 | * | 7/2007 | Humphrey | F16H 63/38 74/473.21 |

FOREIGN PATENT DOCUMENTS

JP  2006-82737  3/2006

* cited by examiner

*Primary Examiner* — David M Fenstermacher  
*Assistant Examiner* — Jake Cook  
(74) *Attorney, Agent, or Firm* — Wenderoth, Lind & Ponack, L.L.P.

(57) ABSTRACT

A speed change apparatus of a vehicle includes: a shift lever device; a gear transmission; and an operation force transmission mechanism for transmitting an operation force of the shift lever device to the gear transmission. The gear transmission includes: a shift mechanism operated by the operation force so as to switch the gear transmission between a plurality of shift positions; and a plurality of detent mechanisms for positioning and holding the shift mechanism at each shift position.

7 Claims, 8 Drawing Sheets

SPEED CHANGE APPARATUS OF VEHICLE

BACKGROUND OF INVENTION

1. Field of the Invention

The present invention relates to a speed change apparatus of a vehicle including a gear transmission, a shift lever device arranged in a zone where an operation thereof is achievable from a driver's seat, and an operation force transmission mechanism for transmitting an operation force of the shift lever device to the gear transmission.

2. Description of the Prior Art

FIG. 10 shows a speed change apparatus according to a conventional art described in JP Laid-open Publication No. 2006-082737. A shift mechanism 300 of a gear transmission T includes a shift shaft 302 supported by a transmission case 301 so as to be movable in an axial direction, a shift fork 303 fixed to the shift shaft 302, and a shift sleeve 306 engaging with the shift fork 303. The shift sleeve 306 is spline-fit onto a speed change shaft 305 so as to be movable in the axial direction. The shift fork 303 is connected to a shift lever device (not shown) through a drive pin 310, an inner lever 311, a lever shaft 312, an outer lever 313, and an operation force transmission mechanism 314. The shift mechanism 300 includes only one detent mechanism 320 for positioning and holding the shift shaft 302 at each shift position in the axial direction.

The detent mechanism 320 comprises a plurality of recesses 321 formed in an outer peripheral surface of the shift shaft 302, a detent ball 322 for engaging selectively with each recess 321, and a coil spring 323 for pushing the detent ball 322 against the outer peripheral surface of the shift shaft 302.

As shown in FIG. 10, in a configuration that only one detent mechanism 320 positions and holds the shift shaft 302 in an inside of the transmission case 301, in order that a force of holding the shift shaft 302 at each shift position should be increased, a spring load of the coil spring 323 need be increased. This requires a coil spring having a larger wire diameter and a larger coil diameter as well as an accommodation space for this. This causes size increase in the transmission case 301. Further, since one site in the axial direction of the shift shaft 302 is strongly pressed in a radial direction, a force acting in a direction of inclining the shift shaft 302 increases. Thus, a sliding resistance of the shift shaft 302 increases and hence a larger shift operation force becomes necessary.

SUMMARY OF THE INVENTION

The present invention has been devised in view of the above-mentioned problems. An object thereof is to provide a speed change operation apparatus of a vehicle in which a holding force for a movable member like a shift shaft can be increased without the necessity of a size increase in the speed change apparatus and with suppressing an increase in a shift operation force.

In order to achieve the above-mentioned object, the present invention provides a speed change apparatus of a vehicle comprising: a gear transmission; a shift lever device arranged in a zone where an operation thereof is achievable from a driver's seat; and an operation force transmission mechanism for transmitting an operation force of the shift lever device to the gear transmission, wherein the gear transmission includes: a shift mechanism operated by the operation force so as to switch the gear transmission between a plurality of shift positions; and a plurality of detent mechanisms for positioning and holding the shift mechanism at each shift position.

According to the present invention, the plurality of detent mechanisms for positioning and holding are arranged for each shift mechanism. Thus, for a movable member of the shift mechanism, the lock portion (the push portion) by the detent member can be distributed to a plurality of sites. Thus, total amount of elastic load can be increased without the necessity of a size increase in the speed change apparatus and with suppressing an increase in the shift operation force. Further, when the lock portion by the detent member is distributed, smoothness in the movement of the movable member is improved.

In addition to the above-mentioned configuration, the present invention may preferably employ the following configurations.

(a) Each detent mechanism includes a plurality of recesses that are formed in the movable member of the shift mechanism and that correspond respectively to the shift positions, and a detent member that is provided in a case member for supporting the movable member and that is capable of engaging with each recess by means of an elastic member.

According to the above-mentioned configuration (a), the plurality of recesses are formed in the movable member while the elastic member and the detent member are arranged in the case member. This permits easy fabrication of the detent mechanism.

(b) In the speed change apparatus employing the above-mentioned configuration (a), the movable member of the shift mechanism is a shift shaft supported by the case member so as to be movable in an axial direction of the shift shaft, and the plurality of detent mechanisms are arranged at least in both side portions in the axial direction of the shift shaft.

According to the above-mentioned configuration (b), both side portions in the axial direction of the shift shaft are pressed by the plurality of detent mechanisms. Thus, even when the elastic load is increased, the movable member is pressed uniformly and hence sliding property is ensured.

(c) In the speed change apparatus employing the above-mentioned configuration (a), the movable member of the shift mechanism is a shift shaft supported by the case member so as to be movable in the axial direction, and a shift fork is supported by the shift shaft while the detent mechanism is arranged on both sides in the axial direction of the shift fork.

According to the above-mentioned configuration (c), in the shift shaft, the portions located on both sides in the axial direction of the shift fork are pressed respectively by the detent mechanisms. Thus, even when the elastic load is increased, the movable member is pressed uniformly and hence sliding property is ensured.

(d) In the speed change apparatus employing the above-mentioned configuration (a), the movable member of the shift mechanism is the shift shaft supported by the case member so as to be movable in the axial direction, and the detent members of the plurality of detent mechanisms are arranged approximately in a same phase in a circumferential direction of the shift shaft.

According to the above-mentioned configuration (d), the plurality of detent mechanisms press the shift shaft in the same direction. Thus, uniform pressing is easily achieved and fabrication is also achieved easily.

(e) In the speed change apparatus employing the above-mentioned configuration (c), the plurality of detent members are arranged on the upper side of the shift shaft.

(f) In the speed change apparatus employing the above-mentioned configuration (c), the elastic member of each detent mechanism biases or pushes each detent member with an elastic load different from each other.

(g) In each speed change apparatus described above, the shift lever device includes a shift lever rotatable about a lever pivot, and a shift panel provided with a shift slot of approximately straight line shape where the shift lever passes.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

FIGS. 1 to 9 show a speed change apparatus according to the present invention and a utility vehicle including the speed change apparatus. Then, an embodiment of the present invention is described below with reference to these drawings. For convenience of description, a forward traveling direction of the utility vehicle will be described as a "front side" of the utility vehicle and respective components, and a left-and-right direction viewed from a driver will be described as a "left-and-right direction" of the utility vehicle and the respective components.

Figure 1:
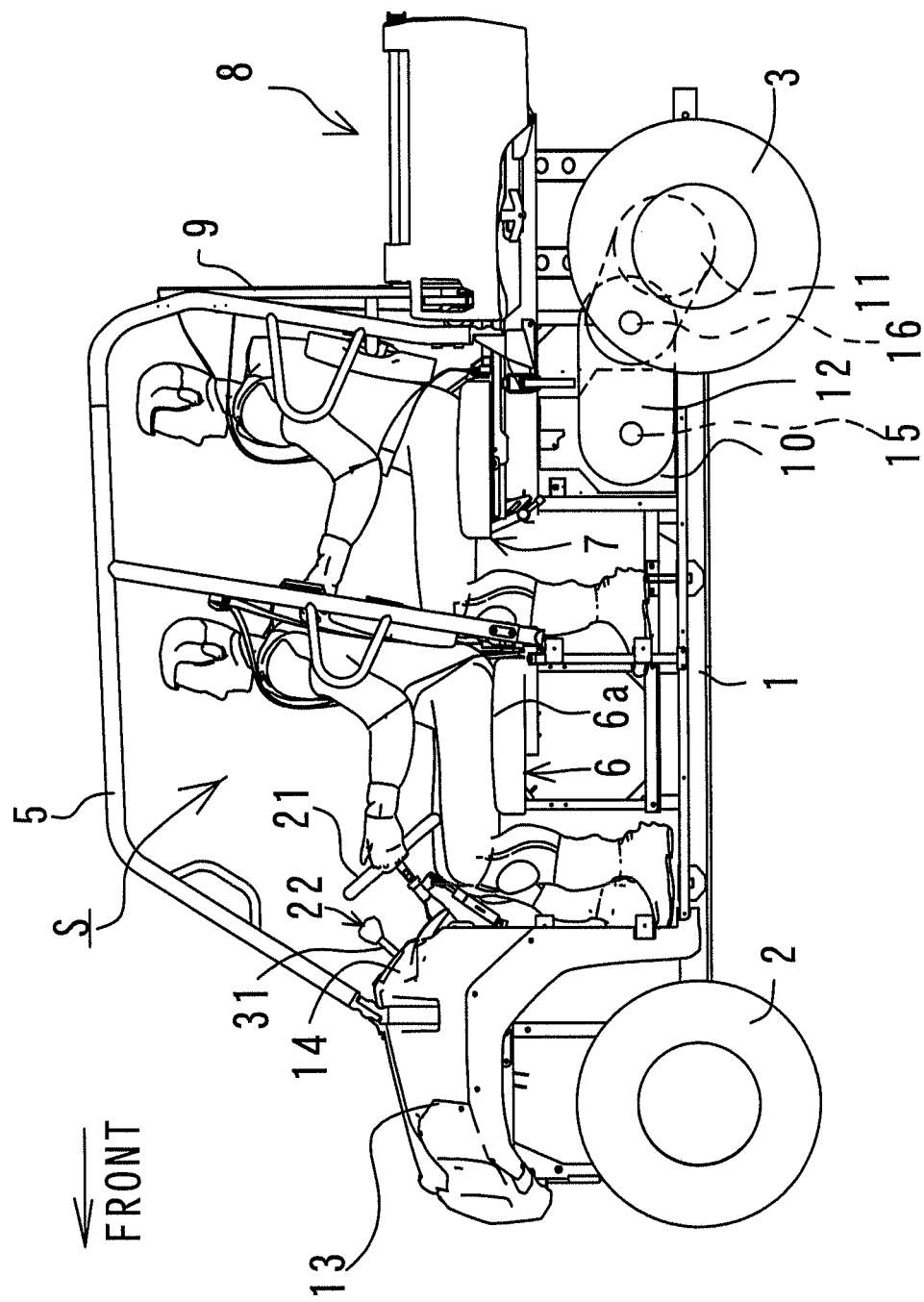
FIG. 1 is a left side view of a utility vehicle including a speed change apparatus according to the present invention.

In FIG. 1, a pair of right and left front wheels 2 is provided in a front portion of a vehicle body frame 1 of the utility vehicle and a pair of right and left rear wheels 3 is provided in a rear portion of the vehicle body frame 1. A riding space S formed between the front wheels 2 and the rear wheels 3 is surrounded by a ROPS 5, where the ROPS 5 is an abbreviation of a rollover protective structure. A bench type front seat 6 is arranged in a front half portion of the riding space S and a bench type rear seat 7 is arranged in a rear half portion of the riding space S. A cargo bed 8 is provided on a backward side of the rear seat 7. A screen 9 is arranged between the bench type rear seat 7 and the cargo bed 8. A bonnet 13 is provided on a forward side of the riding space S and a dashboard 14 is provided in an upper backward end portion of the bonnet 13. In the dashboard 14, a steering wheel device 21 and a shift lever device 22 are provided in a zone where an operation is achievable by the driver sitting in a driver's region 6a of the bench type front seat 6.

An engine 10 is arranged under the rear seat 7 and a gear transmission 11 is arranged on a rear side of the engine 10. An input shaft 16 of the gear transmission 11 is connected to a crankshaft 15 of the engine 10 through a V-belt type continuously variable transmission 12. The V-belt type continuously variable transmission 12 is attached such as to extend from a left side surface of the engine 10 to a left side surface of a front portion of the gear transmission 11.

Figure 2:
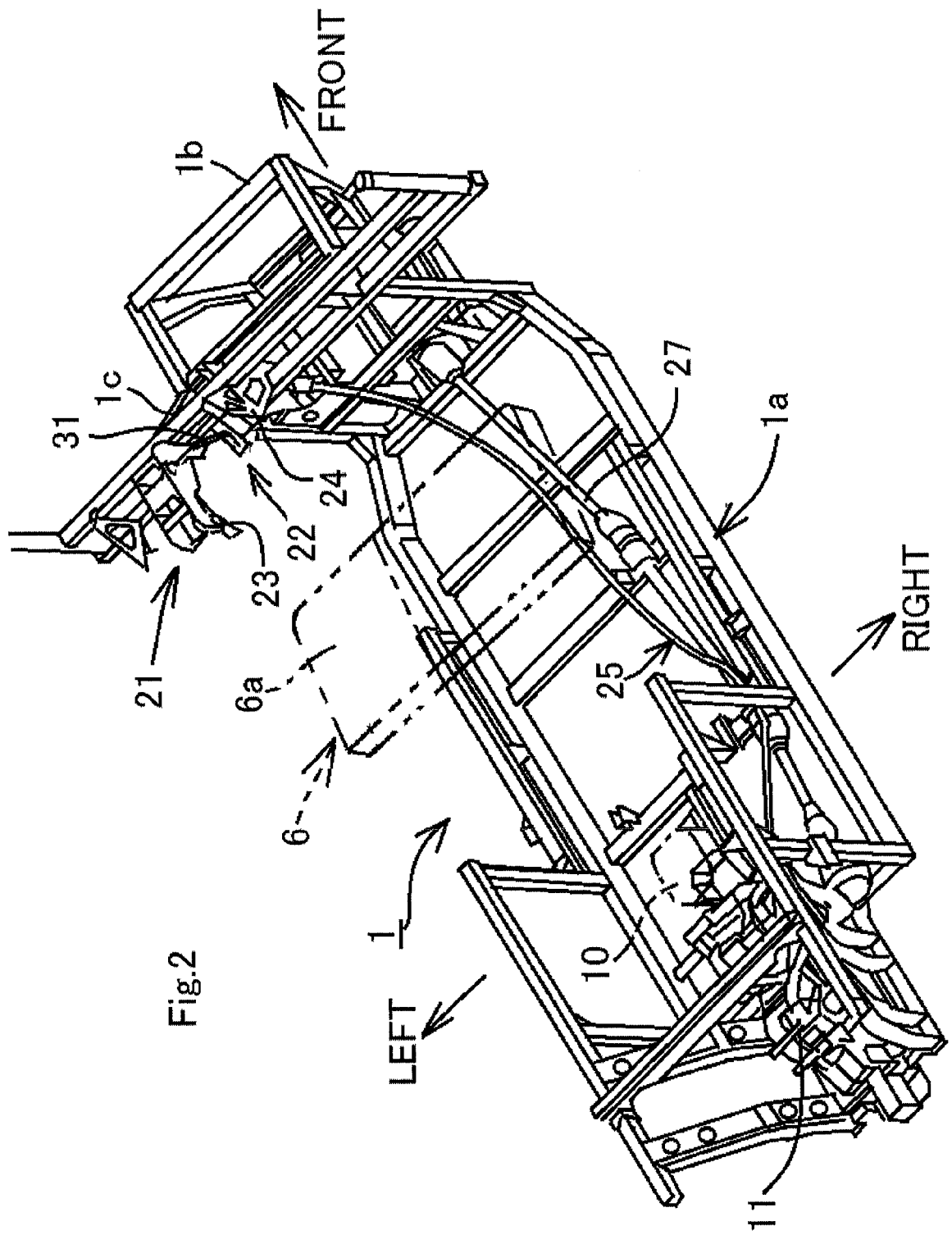
FIG. 2 is a perspective view showing a vehicle body frame and the speed change apparatus of the utility vehicle shown in FIG. 1.

In FIG. 2, the vehicle body frame 1 includes a mainframe 1a having a rectangular shape elongated in forward and backward directions in plan view, a bonnet frame 1b formed in a forward end portion of the mainframe 1a, and a dashboard frame 1c formed in an upper backward end portion of the bonnet frame 1b. A bracket 23 of the steering wheel device 21 and a bracket 24 of the shift lever device 22 are fixed to the dashboard frame 1c. In the present embodiment, the driver's region 6a is located in a left end portion of the bench type front seat 6. Thus, the steering wheel device 21 and the shift lever device 22 are arranged at a forward position relative to the driver's region 6a, that is, in a left side portion of the utility vehicle. The gear transmission 11 arranged in a backward end portion of the mainframe 1a and the shift lever device 22 attached to the dashboard frame 1c are connected to each other through a push-pull type cable mechanism 25 so as to transmit a shift operation force. The push-pull cable mechanism 25 serves as an example of an operation force transmission mechanism described in the claims of the present application, and extends downward from the shift lever device 22, then reaches the forward end portion of the mainframe 1a, then extends right backward on the mainframe 1a approximately along a propeller shaft 27 for front wheels, and then reaches an upper portion of the gear transmission 11.

Figure 3:
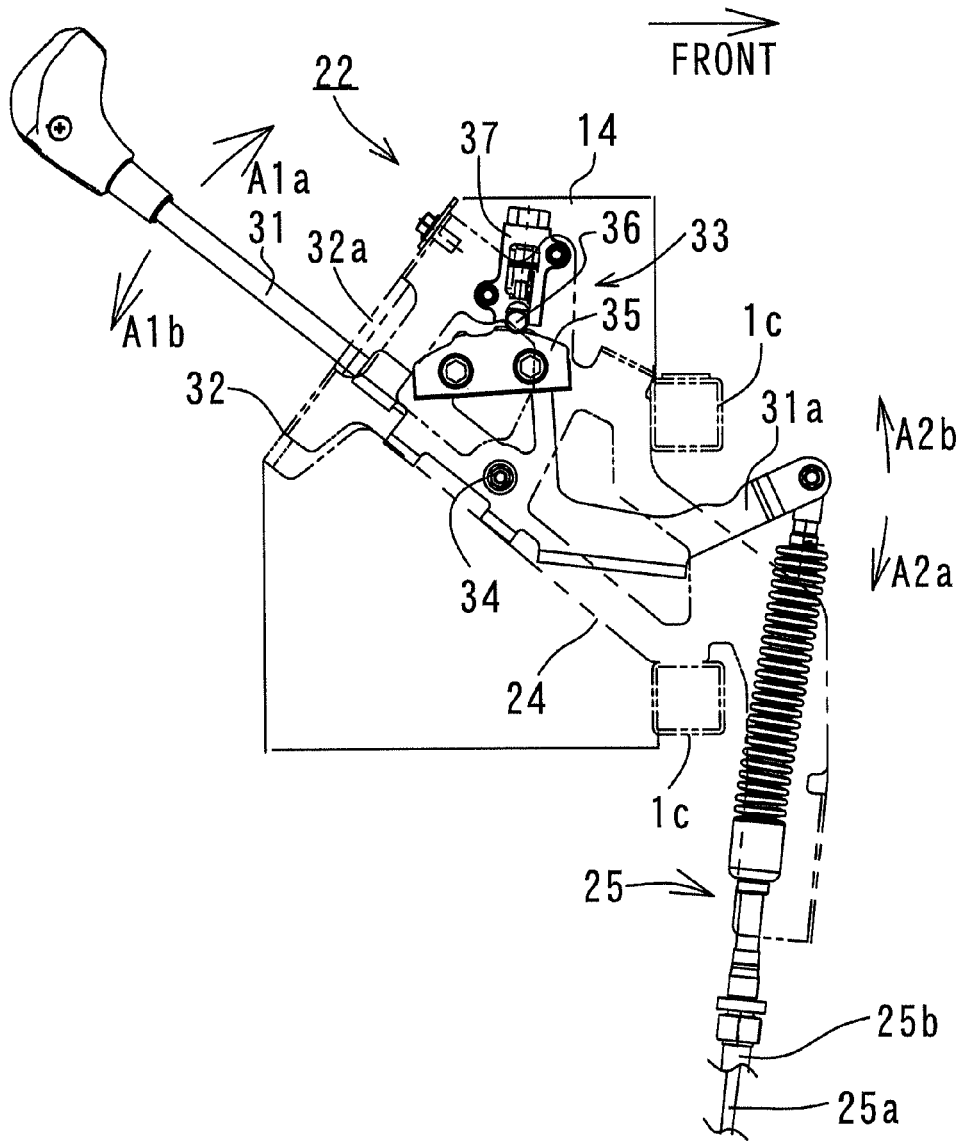
FIG. 3 is a longitudinal sectional view of a shift lever device of the utility vehicle shown in FIG. 1.

In FIG. 3, the shift lever device 22 includes a shift lever 31, a shift panel 32, and a third detent mechanism 33 (a first and a second detent mechanisms are described later). The shift lever 31 is supported by the bracket 24 fixed to the dashboard frame 1c through a pivot 34 so as to be turnable or rotatable around the pivot 34. The shift lever 31 passes through a shift slot 32a of the shift panel 32 and then protrudes upper backward. A lower end portion 31a of the shift lever 31 protrudes forward. Further, a forward end of the lower end portion 31a is connected to an inner cable 25a of the push-pull cable mechanism 25. The inner cable 25a is inserted into an outer cable 25b and then extends downward together with the outer cable 25b. The third detent mechanism 33 includes a recess-formed member 35 provided in the shift lever 31, a third detent spring 37 arranged in the bracket 24, and a third detent ball 36 pressed against the recess-formed member 35 by the third detent spring 37.

Figure 4:
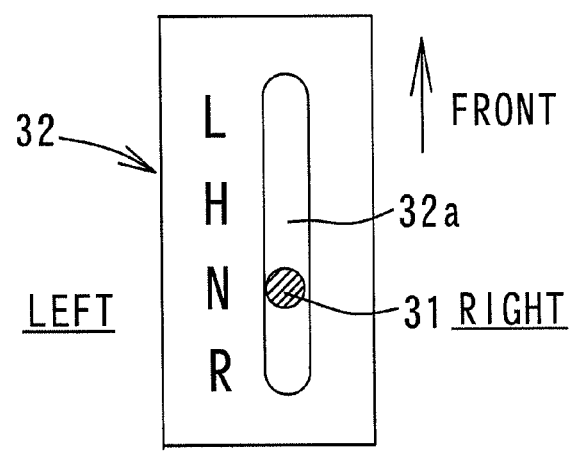
FIG. 4 is a plan view of a shift panel of the shift lever device shown in FIG. 3.

In FIG. 4, the shift slot 32a is formed in a straight line shape extending from an upper forward end portion of the shift panel 32 to a lower backward end portion thereof. Then, the shift lever 31 moves in a straight line in an inside of the shift slot 32a so that four shift positions are switched. The four shift positions are, in the order from the upper forward end to the lower backward end, a forward traveling low-speed position (L), a forward traveling high-speed position (H), a neutral position (N), and a reverse position (R).

Figure 5:
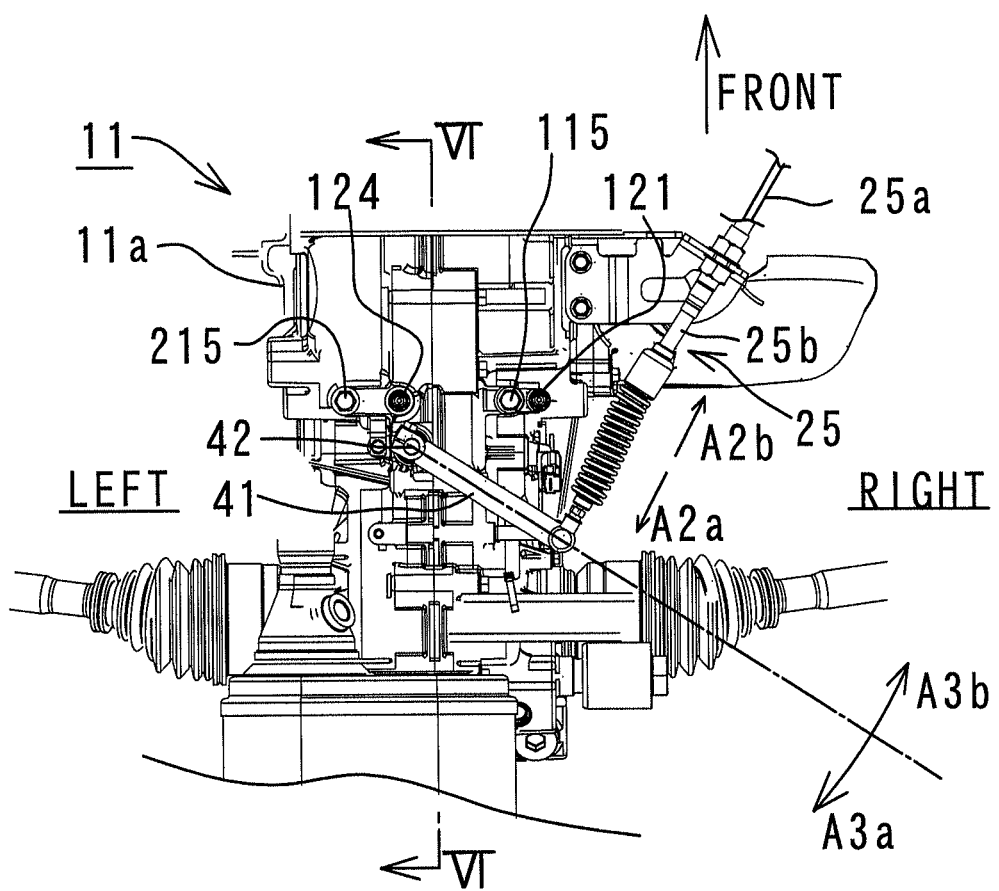
FIG. 5 is a partially plan view of the speed change apparatus shown in FIG. 1.

In FIG. 5, a backward end portion of the inner cable 25a of the push-pull cable mechanism 25 is connected to an outer lever 41 arranged above a transmission case 11a. The outer lever 41 is fixed to an upper end portion of the lever shaft 42 extending approximately vertically.

Figure 6:
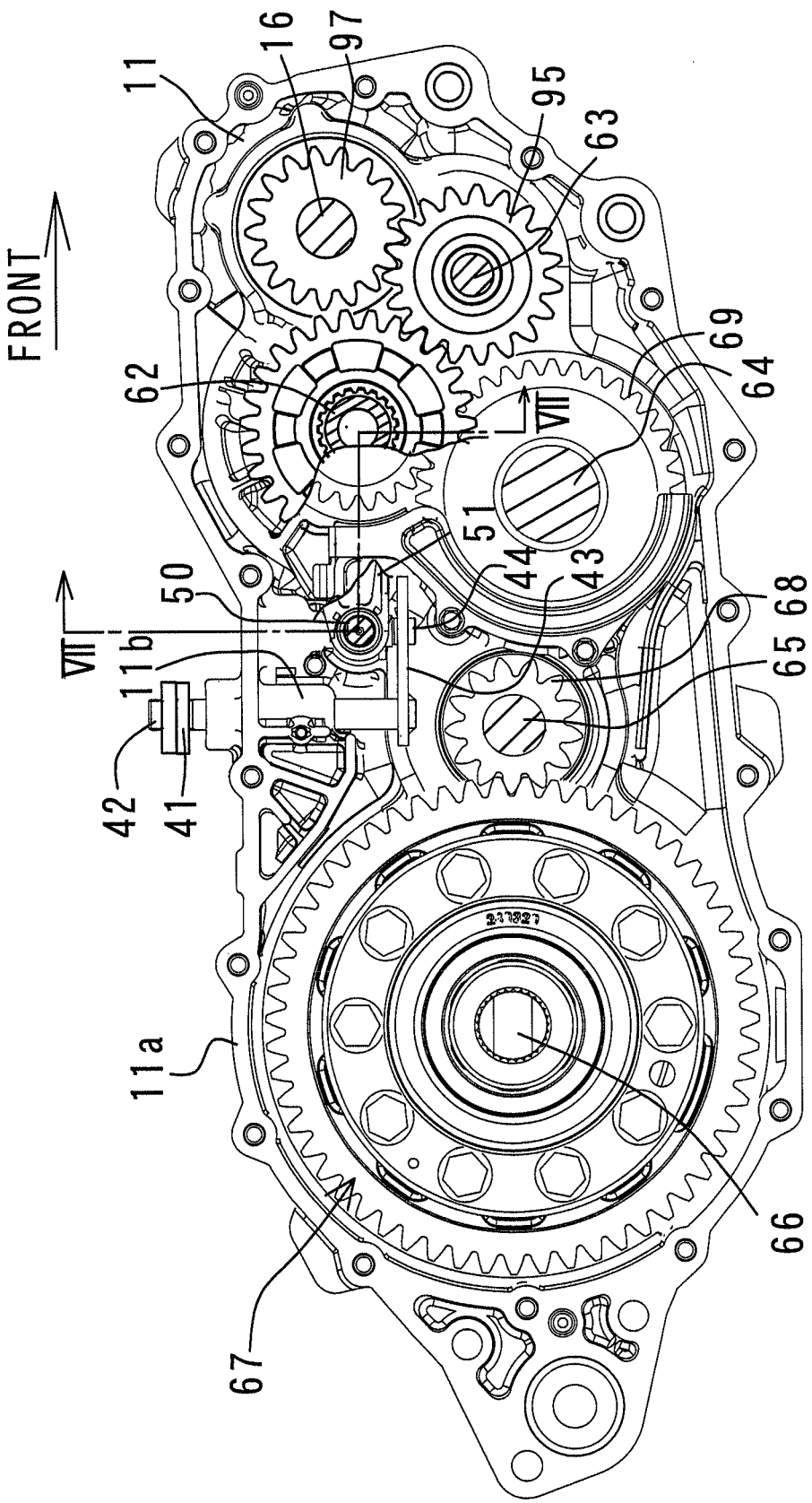
FIG. 6 is a center longitudinal sectional view (corresponding to a cross section taken along line VI-VI in FIG. 5) of the speed change apparatus shown in FIG. 1.

In FIG. 6, the lever shaft 42 is arranged in an approximately center portion in forward and backward directions of the transmission case 11a, then passes through an upper wall boss portion 11b of the transmission case 11a in up and down directions, and then is free-rotatably supported by the upper wall boss portion 11b. The inner lever 43 arranged in the transmission case 11a is fixed to the lower end portion of the lever shaft 42, then extends forward in an approximately horizontal direction from the lever shaft 42, and then reaches a space under the shift shaft 50.

The shift shaft 50 serves an example of the movable member of the shift mechanism described in the claims of the present application, and is arranged on a forward side of the lever shaft 42 and extends in the right and left directions.

In a space on the forward side of the shift shaft 50, the input shaft 16 of the gear transmission 11, a counter shaft 62, a reverse idler shaft 63, and an output shaft 64 for front wheels are arranged approximately in parallel to the shift shaft 50. The input shaft 16 is arranged in an upper forward end of the transmission case 11a, the counter shaft 62 is arranged on a backward side of the input shaft 16, and the reverse idler shaft 63 is arranged in an under space between the input shaft 16 and the counter shaft 62. The output shaft 64 for front wheels is arranged under the counter shaft 62, and is connected to the propeller shaft 27 for front wheels (FIG. 2) through a two-wheel drive to four-wheel drive switching mechanism (not shown), so as to transmit a rotation power.

An intermediate output shaft 65 for rear wheels and a drive shaft 66 for rear wheels are arranged in a space on a backward side of the shift shaft 50. The drive shaft 66 is connected to the counter shaft 62 through a differential mechanism 67, a gear 68 of the intermediate output shaft 65 for rear wheels and a gear 69 of the output shaft 64 for front wheels, so as to transmit the rotation power.

Figure 8:
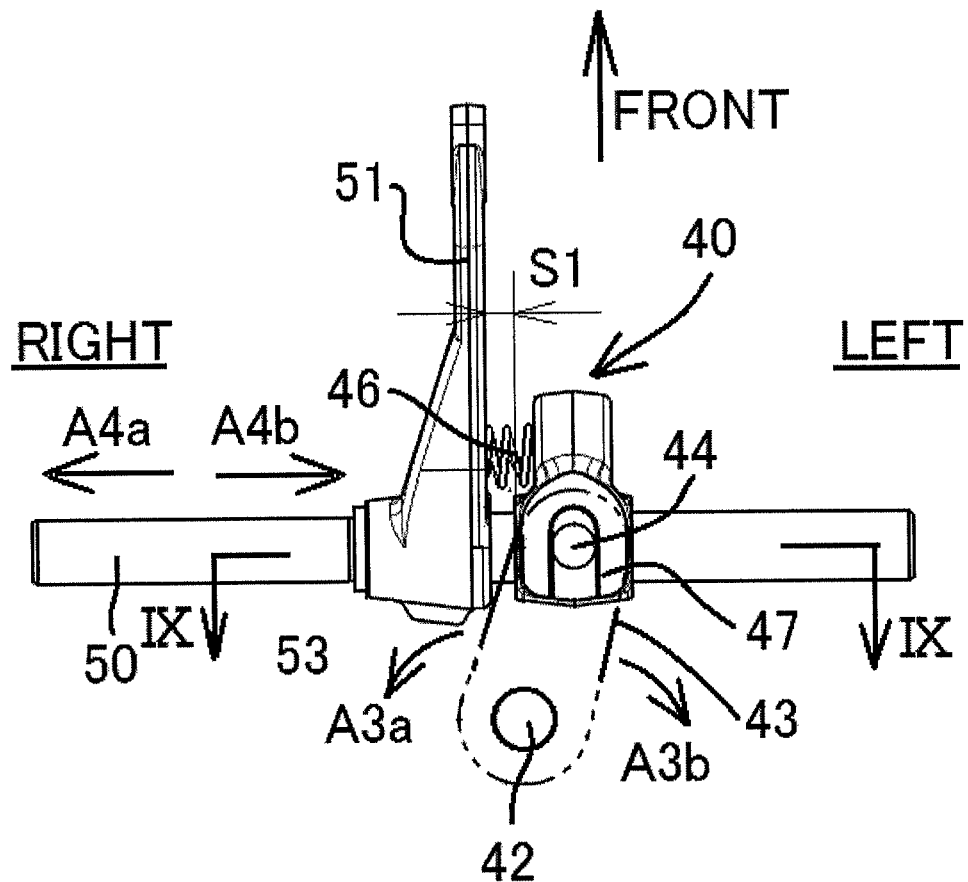
FIG. 8 is a bottom view of the shift shaft shown in FIG. 6.

FIG. 8 is a bottom view of the shift shaft 50, where the shift fork 51 is fit on an outer peripheral surface of the shift shaft 50 within a range of a predetermined stroke S1 in the axial direction so as to be movable in the axial direction. The shift fork 51 is connected to the inner lever 43 of the lever shaft 42 through a waiting mechanism 40 so as to transmit the shift operation force.

The waiting mechanism 40 includes a spring holder 45 arranged on a left side (in an arrow A4b direction side) of the shift fork 51 with a predetermined stroke S1 in between, and a coil spring 46 provided between the spring holder 45 and the shift fork 51 so as to be compressible and extendable in the axial direction. The coil spring 46 is arranged on a forward side of the shift shaft 50. An engagement groove 47 extending in the forward and backward directions is formed in a lower surface of the spring holder 45. Then, a backward end of the engagement groove 47 is opened. A forward end portion of the inner lever 43 fixed to the lower end portion of the lever shaft 42 is provided with an engaging pin 44. The engaging pin 44 engages with the engagement groove 47 so as to movable forward and backward.

Figure 9:
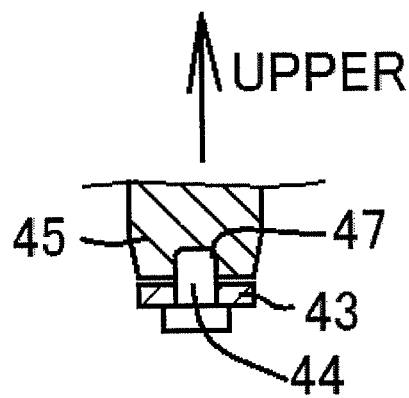
FIG. 9 is a sectional view taken along line IX-IX in FIG. 8.
Figure 10:
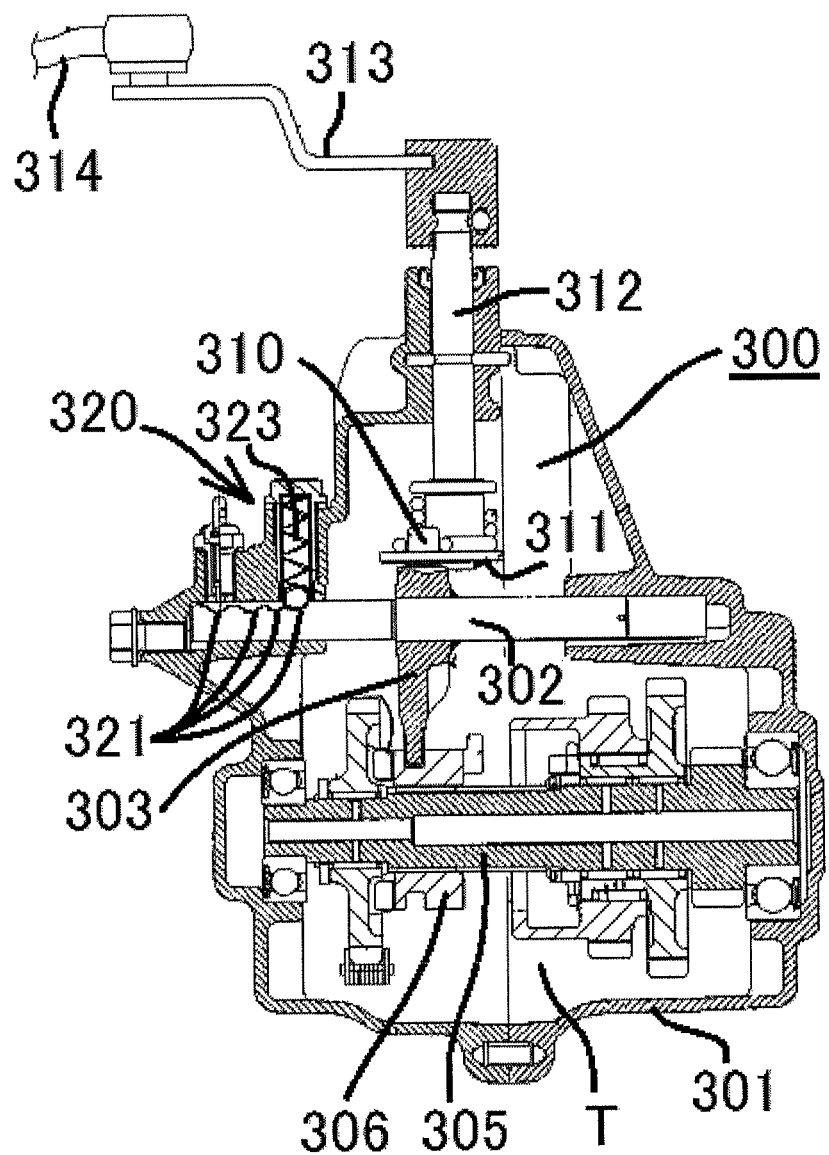
FIG. 10 is a sectional view of a conventional example.

FIG. 9 is a sectional view taken along line IX-IX in FIG. 8, where the engaging pin 44 of the inner lever 43 protrudes upward and then engages with the engagement groove 47 of the spring holder 45 from below.

Figure 7:
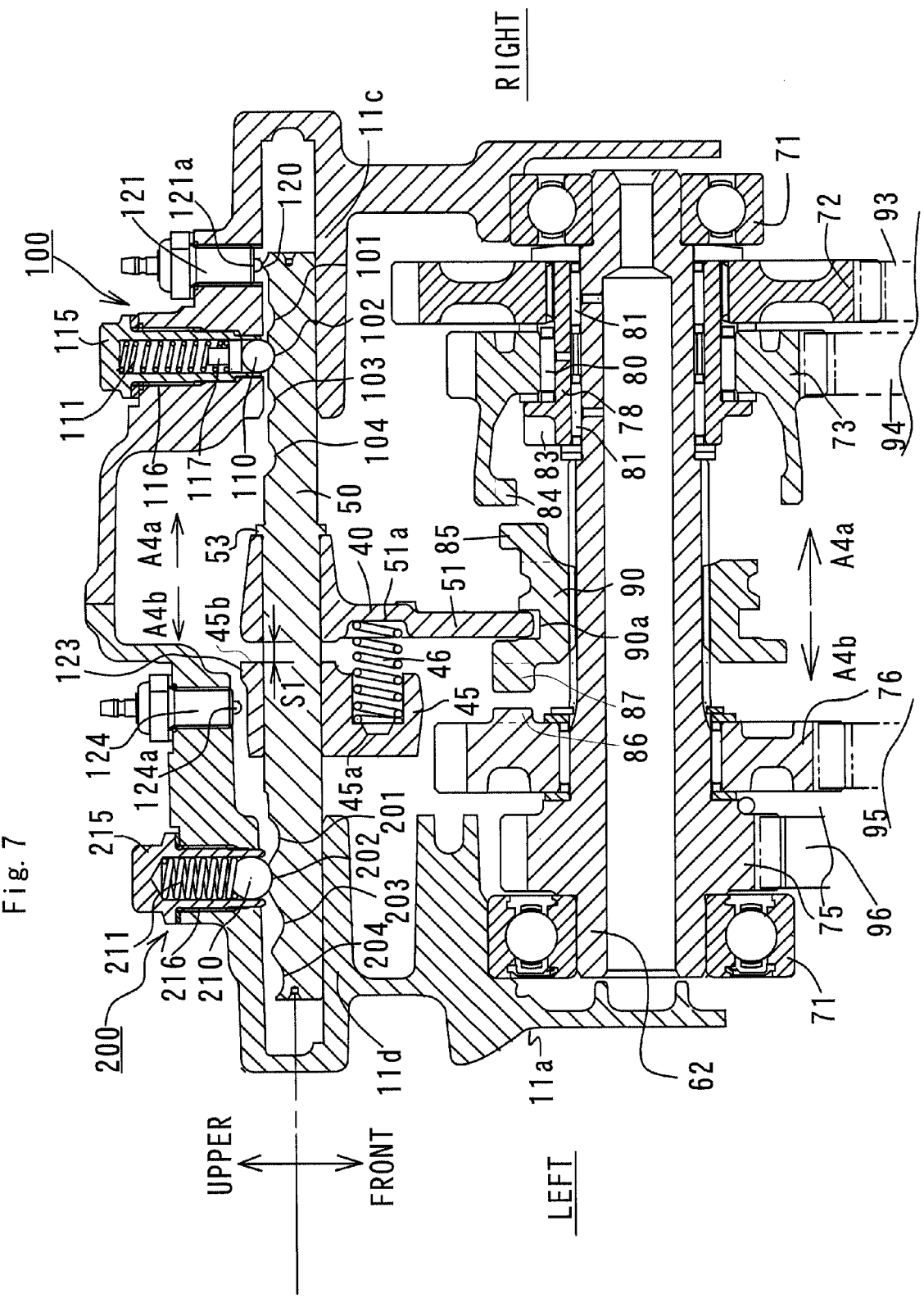
FIG. 7 is a sectional view of the speed change apparatus shown in FIG. 6, taken along line VII-VII.

In FIG. 7, the shift shaft 50 is supported by a right support boss 11c formed in a right side wall of the transmission case 11a and a left support boss 11d formed in a left side wall of the transmission case 11a so as to be slidable in the axial direction.

The waiting mechanism 40 is described below in detail. Amount of leftward relative movement of the shift fork 51 relative to the shift shaft 50 is restricted by a right end surface 45b of the spring holder 45. Further, Amount of rightward relative movement of the shift fork 51 relative to the shift shaft 50 is restricted by an annular stopper 53 formed in the outer peripheral surface of the shift shaft 50. The spring holder 45 is provided with a forward projection portion protruding forward from the shift shaft 50. Then, in a right end surface of the forward projection portion, a cylindrical recess 45a into which a left side portion of the coil spring 46 is inserted is formed. On the other hand, in a left end surface of the shift fork 51 protruding forward from the shift shaft 50, a cylindrical recess 51a for accommodating a right end portion of the coil spring 46 is formed. That is, both of the right and the left end portions of the coil spring 46 are inserted into and supported by the recess 45a of the spring holder 45 and the recess 51a of the shift fork 51.

FIG. 7 shows a neutral state that a shift operation is not yet performed. In this state, the shift fork 51 is pressed or pushed rightward by the coil spring 46 and a right end surface of the shift fork 51 abuts against the stopper 53.

When the shift shaft 50 and the spring holder 45 move integrally rightward, the shift fork 51 also moves rightward with the coil spring 46 in between. When a resistance force in the axial direction acting on the shift fork 51 from a shift sleeve 90 (described later) increases to a predetermined value or higher, the spring holder 45 and the shift shaft 50 move rightward relatively to the shift fork 51 so as to compress the coil spring 46. When the coil spring 46 is compressed by the predetermined stroke S1, the right end surface 45b of the spring holder 45 abuts against the left end surface of the shift fork 51. On the contrary, when the shift shaft 50 and the spring holder 45 move leftward, the shift fork 51 moves leftward with the stopper 53 in between.

A structure of the gear transmission 11 is briefly described below. In FIG. 7, both ends in the axial direction of the counter shaft 62 are free-rotatably supported by the transmission case 11a through bearings 71 in between. In a right end portion of the counter shaft 62, a counter low gear 72 for forward traveling low-speed and a counter high gear 73 for forward traveling high-speed are arranged in the order from right to left. Then, in the left end portion of the counter shaft 62, an output gear 75 and a counter reverse gear 76 are arranged in the order from left to right. The output gear 75 is formed integrally with the counter shaft 62. The counter reverse gear 76 is fit onto the counter shaft 62 so as to be free-rotatable around the counter shaft 62 and not to be movable in the axial direction.

The counter low gear 72 is spline-fit onto an outer peripheral surface of a boss member 78 so as to rotate integrally with the boss member 78. The boss portion 78 is formed separately from the counter low gear 72. The counter high gear 73 is fit onto the outer peripheral surface of the boss member 78 with a needle bearing 80 in between so as to be free-rotatable relative to the boss portion 78. The boss member 78 is fit onto the outer peripheral surface of the counter shaft 62 with a pair of needle bearings 81 in between so as to be free-rotatable relative to the counter shaft 62. A left end portion of the boss member 78 is provided with low-speed dog claws 83 and the counter high gear 73 is provided with high-speed dog claws 84. The high-speed dog claws 84 extend leftward beyond the low-speed dog claws 83. The counter reverse gear 76 is provided with reverse dog claws 86.

The counter low gear 72 and the counter high gear 73 engage respectively with an input low gear 93 and an input high gear 94. Further, the counter reverse gear 76 engages with an idle reverse gear 95 and the output gear 75 engages with a second output gear 96.

The input low gear 93 and the input high gear 94 are arranged on the input shaft 16 shown in FIG. 6. The idle reverse gear 95 is fit onto the reverse idler shaft 63 and engages with the input reverse gear 97 of the input shaft 16.

Returning to FIG. 7, the shift sleeve 90 of the above-mentioned shift mechanism is spline-fit onto a center portion in the axial direction of the counter shaft 62 between the counter high gear 73 and the counter reverse gear 76 so as to be movable in the axial directional. The shift sleeve 90 is provided with forward traveling dog claws 85 integrally formed at a right end, backward traveling dog claws 87 integrally formed at a left end, and an outer periphery circular groove 90a formed in a center portion such as to be engaged with a two-pronged portion of the shift fork 51. Since the two-pronged portion of the shift fork 51 engages with the outer periphery circular groove 90a, a rotation of the shift fork 51 about the shift shaft 50 is avoided.

FIG. 7 shows a situation that the shift sleeve 90 is at a neutral position. When the shift sleeve 90 moves rightward (in an arrow A4a direction) from the neutral position, first, the forward traveling dog claws 85 of the shift sleeve 90 engage with the high-speed dog claws 84 of the counter high gear 73 so that the gear transmission 11 goes into the forward traveling high-speed state. Further, when the shift sleeve 90 moves in the arrow A4a direction, the forward traveling dog claws 85 of the shift sleeve 90 pass a neutral state and then engage with the low-speed dog claws 83 of the boss member 78 so that the gear transmission 11 goes into the forward traveling low-speed state. On the contrary, when the shift sleeve 90 moves leftward (in an arrow A4b direction) from the neutral position, the backward traveling dog claws 87 of the shift sleeve 90 engage with the reverse dog claws 86 of the counter reverse gear 76 so that the gear transmission 11 goes into the backward traveling state.

As described above, the shift mechanism includes the shift shaft 50, the shift fork 51, the waiting mechanism 40, and the shift sleeve 90 and further includes a first detent mechanism 100 formed in a right side portion in the axial direction of the shift shaft 50 and a second detent mechanism 200 formed in a left side portion of the shift shaft 50. In the shift shaft 50, a rotation of the shift shaft 50 is prevented by pressing a force of the two detent mechanisms 100 and 200 and by a resistance force of the shift fork 51 engaging in the rotation direction with the coil spring 46 in between.

The first and the second detent mechanisms 100 and 200 are described below. The first detent mechanism 100 on the right side includes four detent recesses 101, 102, 103, and 104 formed in an upper end surface of the shift shaft 50, a first detent ball 110 arranged on the upper surface of the shift shaft 50, and a first detent spring 111 for pressing the first detent ball 110 against the upper surface of the shift shaft 50. The first detent ball 110 serves as an example of the detent member described in the claims of the present application. Further, the first detent spring 111 serves as an example of the elastic member described in the claims of the present application.

The first detent spring 111 is arranged in an inside of a first spring case 115. The first spring case 115 is inserted and screwed from above into a female screw hole 116 formed in the right support boss 11c. A lower end of the first spring case 115 is opened from above into an inner space of the right support boss 11c. An upper end of the first detent spring 111 abuts against an upper wall of the first spring case 115 and a lower end of the first detent spring 111 abuts against a first push rod 117 so as to press the push rod 117 downward. The first detent ball 110 is located in the lower end opening portion in the inside of the first spring case 115 and abuts against a lower end surface of the push rod 117 so as to be biased downward by the first detent spring 111 with the push rod 117 in between and engage selectively with the four detent recesses 101, 102, 103, and 104.

The four detent recesses 101, 102, 103, and 104 are, in the order from right to left, a reverse detent recess 101, a neutral detent recess 102, a high detent recess 103 for forward traveling high-speed, and a low detent recess 104 for forward traveling low-speed. The four detent recesses 101, 102, 103, and 104 are each formed in the shape of a partially spherical surface approximately corresponding to an outer peripheral surface shape of the first detent ball 111. However, the reverse detent recess 101 on the rightmost side is extended rightward in the axial direction by a little amount and the reverse detent recess 104 on the leftmost side is extended leftward in the axial direction by a little amount.

Further, in the upper end surface of the shift shaft 50, a protrusion 120 for neutral detection is formed at a position on the right side of reverse detent recess 101. On the other hand, the right support boss 11c is provided with a neutral position detector 121. When the shift shaft 50 is at the neutral position, the protrusion 120 goes into contact with a lower-end detection rod 121a of the neutral position detector 121. The neutral position detector 121 is electrically connected to a meter device (not shown) and then turns ON a neutral indicator of the meter device when the protrusion 120 is detected.

The second detent mechanism 200 on the left side includes four detent recesses 201, 202, 203, and 204 formed in the upper end surface of the shift shaft 50, a second detent ball 210 arranged on the upper end surface of the shift shaft 50, and a second detent spring 211 for pressing the second detent ball 210 against the upper surface of the shift shaft 50. The second detent ball 210 serves as an example of the detent member described in the claims of the present application. Further, the second detent spring 211 serves as an example of the elastic member described in the claims of the present application.

The basic configuration of the second detent mechanism 200 is similar to that of the first detent mechanism 100. However, a diameter of the second detent ball 210 is greater than a diameter of the first detent ball 110 and a wire diameter and a coil diameter of the second detent spring 211 are greater than a wire diameter and a coil diameter of the first detent spring 111. That is, the second detent mechanism 200 has a larger spring load (pressing load) than the first detent mechanism 100.

The second detent spring 211 is arranged in an inside of a second spring case 215. Then, the second spring case 215 is inserted and screwed from above into a female screw hole 216 formed in the left support boss 11d. A lower end of the second spring case 215 is opened from above into an inner space of the left support boss 11d. An upper end of the second detent spring 211 abuts against an upper wall of the second spring case 215 and a lower end of the second detent spring 211 abuts against the upper end of detent ball 210. The second detent ball 210 is located in a lower end opening portion in the inside of the second spring case 215 and engages selectively with the four detent recesses 201, 202, 203, and 204.

The four detent recesses 201, 202, 203, and 204 are, in the order from right to left, a reverse detent recess 201, a neutral detent recess 202, a high detent recess 203 for forward traveling high-speed, and a low detent recess 204 for forward traveling low-speed.

Among the four detent recesses 201, 202, 203, and 204, the neutral detent recess 202 is smaller than the other three detent recesses 201, 203, and 204 and located above them. Further, the neutral detent recess 202 has a shape of a partially spherical surface corresponding to an outer peripheral surface of the second detent ball 210. In the reverse detent recess 201, the high detent recess 203, and the low detent recess 204, each lower end has the shape of a partially spherical surface corresponding to an outer peripheral surface shape of the second detent ball 210. However, a flat inclined surface of weak inclination is formed in a left side portion of the reverse detent recess 201, a left side portion and a right side portion of the high detent recess 203, and a right side portion of the low detent recess 204. The reason why the neutral detent recess 202 is formed such as to have a smaller area and a higher bottom position than the other detent recesses 201, 203, and 204 as described above is that at the neutral position, no dog claws engage with each other and hence positioning does not require a large load.

Further, a protrusion 123 for reverse detection is formed in an upper end portion of the spring holder 45 of the waiting mechanism 40. On the other hand, the left support boss 11d is provided with a reverse position detector 124. When the shift shaft 50 is at the reverse position, the protrusion 123 goes into contact with a lower-end detection rod 124a of the reverse position detector 124. The reverse position detector 124 is electrically connected to a meter device (not shown) and then turns ON a reverse indicator of the meter device when the protrusion 123 is detected.

The shift operation is described below.

[Shift from Neutral State to Forward Traveling High-Speed State]

(1) In FIG. 1, during the time that the vehicle is traveling or stopping, the driver sitting in the driver's region 6a grips a knob in the upper end portion of the shift lever 31 with his/her right hand and operates the shift lever 31. That is, the shift lever 31 at the neutral position (N) shown in FIG. 4 is turned or moved to the forward traveling high-speed position (H).

(2) In FIG. 3, when the shift lever 31 is turned in an arrow A1a direction from the neutral position (N) to the forward traveling high-speed position (H), the inner cable 25a of the cable mechanism 25 is pushed down in an arrow A2a direction(downward) in the inside of the outer cable 25b.

(3) In FIG. 5, in association with the movement of the inner cable 25a in the arrow A2a direction, the outer lever 41 and the lever shaft 42 are turned or rotated about an axis of the lever shaft 42 in an arrow A3a direction.

(4) In FIG. 8, the inner lever 43 is turned integrally with the lever shaft 42 in the arrow A3a direction. In association with this, the shift shaft 50 and the spring holder 45 move integrally in the arrow A4a direction (rightward) by virtue of the engaging pin 44 and the edge of the engagement groove 47.

(5) In FIG. 7, when the shift shaft 50 and the spring holder 45 move in the arrow A4a direction (rightward), the shift fork 51 also moves in the arrow A4a direction with the coil spring 46 in between.

(6) In association with the movement of the shift shaft 50 in the arrow A4a direction, the first detent ball 110 and the second detent ball 210 escape upward from the neutral detent recesses 102 and 202, respectively.

(7) When the shift shaft 50, the spring holder 45, the shift fork 51, and the shift sleeve 90 move in the arrow A4a direction from the neutral position to the forward traveling high-speed position, almost at the same time that the forward traveling dog claws 85 of the shift sleeve 90 engage with the high-speed dog claws 84 of the counter high gear 73, the first detent ball 110 and the second detent ball 210 engage respectively with the high detent recesses 103 and 203.

(8) In the course that the shift sleeve 90 moves from the neutral position to the forward traveling high-speed position, in some cases, the forward traveling dog claws 85 of the shift sleeve 90 abut against left end surfaces in the axial direction of the high-speed dog claws 84 of the counter high gear 73 so that the dog claws 85 and 84 do not engaged with each other. In such cases, the waiting mechanism 40 acts. That is, when the forward traveling dog claws 85 of the shift sleeve 90 abut against the left end surface of the high-speed dog claws 84 of the counter high gear 73, after that, the shift shaft 50 and the spring holder 45 move further in the arrow A4a direction relative to the shift sleeve 90 and the shift fork 51 which are stopping. As a result, the coil spring 46 is compressed so that energy is stored into the coil spring 46 and, at the same time, the first detent ball 110 and the second detent ball 210 engage respectively with the high detent recesses 103 and 203 for forward traveling high-speed.

(9) After that, in association with a relative rotation of the counter shaft 62 and the shift sleeve 90 relative to the counter high gear 73, when a phase of the forward traveling dog claws 85 of the shift sleeve 90 and a phase of the high-speed dog claws 84 of the counter high gear 73 go into agreement with each other, the coil spring 46 expands. Then, in association with the expansion of the coil spring 46, the shift fork 51 and the shift sleeve 90 move in the arrow A4a direction so that the forward traveling dog claws 85 of the shift sleeve 90 engage with the high-speed dog claws 84 of the counter high gear 73.

(10) In the forward traveling low-speed state of the gear transmission 11, the first and the second detent balls 110 and 210 engage respectively with the high detent recesses 103 and 203 for forward traveling high-speed so as to be positioned and held.

(11) In the above-mentioned shift operation, in addition to the role of positioning and holding the shift shaft 50 at the forward traveling high-speed position, the second detent mechanism 200 plays also a role of smoothly guiding and pulling the shift shaft 50 into the forward traveling high-speed position. That is, at an early stage that the second detent ball 210 enters the high detent recess 203, the second detent ball 210 is smoothly guided and pulled to a deep bottom of the high detent recess 203 by the flat inclined surface on the right side of the high detent recess 203. Then, at last, when the first and the second detent balls 110 and 210 both engage with the high detent recesses 103 and 203, total of the spring loads (the pressing loads) of the detent springs 111 and 211 causes the shift shaft 50 to be held at the forward traveling high-speed position.

[Shift from Forward Traveling High-Speed State to Forward Traveling Low-Speed State]

(1) In FIG. 4, the shift lever 31 is turned upward further from the forward traveling high-speed position (H) to the forward traveling low-speed position (L). An action for transmitting the shift operation force from the shift lever 31 to the shift shaft 50 shown in FIG. 7 is similar to an action at the time of shift from the above-mentioned neutral position to the forward traveling high-speed position. Thus, description is omitted.

(2) In FIG. 7, when the shift shaft 50 and the spring holder 45 move further in the arrow A4a direction from the forward traveling high-speed position, the shift fork 51 also moves further in the arrow A4a direction with the coil spring 46 in between.

(3) In association with the movement of the shift shaft 50 in the arrow A4a direction, the first detent ball 110 and the second detent ball 210 escape upward from the high detent recesses 103 and 203 for forward traveling high-speed, respectively.

(4) When the shift shaft 50, the spring holder 45, the shift fork 51, and the shift sleeve 90 move in the arrow A4a direction from the forward traveling high-speed position to the forward traveling low-speed position, the forward traveling dog claws 85 of the shift sleeve 90 escape from the high-speed dog claws 84 of the counter high gear 73, then pass the neutral state, and then engage with the low-speed dog claws 83 of the counter low gear 72. At approximately the same time as this, the first detent ball 110 and the second detent ball 210 engage respectively with the low detent recesses 104 and 204.

(5) In the course that the shift sleeve 90 moves from the forward traveling high-speed position to the forward traveling low-speed position, in some cases, the forward traveling dog claws 85 of the shift sleeve 90 abut against a left end surface of the low-speed dog claws 83 of the counter low gear 72 so that the dog claws 85 and 83 do not engaged with each other. Also in such cases, the waiting mechanism 40 acts. That is, after the forward traveling dog claws 85 of the shift sleeve 90 abut against the left end surface of the low-speed dog claws 83 of the counter low gear 72, the shift shaft 50 and the spring holder 45 move further in the arrow A4a direction relative to the shift sleeve 90 and the shift fork 51 which are stopping. As a result, the coil spring 46 is compressed so that energy is stored into the coil spring 46 and, at the same time, the first detent ball 110 and the second detent ball 210 engage respectively with the low detent recesses 104 and 204 for forward traveling low-speed.

(6) After that, in association with the relative rotation of the counter shaft 62 and the shift sleeve 90 relative to the counter low gear 72, when the phase of the forward traveling dog claws 85 of the shift sleeve 90 and a phase of the low-speed dog claws 83 of the counter low gear 72 go into agreement with each other, the coil spring 46 expands. Then, in association with the expansion of the coil spring 46, the shift fork 51 and the shift sleeve 90 move in the arrow A4a direction so that the forward traveling dog claws 85 of the shift sleeve 90 engage with the low-speed dog claws 83 of the counter low gear 72.

(7) In the forward traveling low-speed state of the gear transmission 11, the first and the second detent balls 110 and 210 engage respectively with the low detent recesses 104 and 204 for forward traveling low-speed so as to be positioned and held.

(8) In the above-mentioned shift operation, in addition to the role of positioning and holding the shift shaft 50 at the forward traveling low-speed position, similarly to the above-mentioned shift action to the forward traveling high-speed position, the second detent mechanism 200 plays also the role of smoothly guiding and pulling the shift shaft 50 into the forward traveling low-speed position by using the flat inclined surface formed in the right side portion of the low detent recess 204 of the second detent mechanism 200. Further, also at the time that the second detent ball 210 escapes from the high detent recess 203 for forward traveling high-speed, the second detent ball 210 smoothly escapes from the high detent recess 203 by virtue of the flat inclined surface formed in the left side of the high detent recess 203.

That is, despite that both side portions of the shift shaft 50 are pressed by the first and the second detent balls 110 and 210, the first and the second detent balls 110 and 210 smoothly escape from the high detent recesses 103 and 203 and smoothly engage with the low detent recesses 104 and 204.

(9) Further, in the first detent mechanism 100, the left end of the low detent recess 104 is slightly extended leftward in the axial direction. Thus, in the forward traveling low-speed position, an overstroke of the shift shaft 50 is ensured.

That is, in a configuration that the push-pull cable mechanism 25 is employed as the operation force transmission mechanism, in some cases, the stroke of the shift lever operation is not sufficiently transmitted to the shift shaft 50. In such cases, the shift shaft 50 is caused to exceed the regular forward traveling low-speed position in the rightward direction so that complete engagement between the forward traveling dog claws 85 of the shift sleeve 90 and the low-speed dog claws 83 of the counter low gear 72 is ensured.

[Shift from Forward Traveling High-Speed State to Neutral State]

(1) In FIG. 4, the shift lever 31 is turned or moved downward from the forward traveling high-speed position (H) to the neutral position (N).

(2) In FIG. 3, when the shift lever 31 is turned in an arrow A1b direction from the forward traveling high-speed position (H) to the neutral position (N), the inner cable 25a of the cable mechanism 25 is pushed up in an arrow A2b direction (upward) in the inside of the outer cable 25b.

(3) In FIG. 5, in association with the movement of the inner cable 25a in the arrow A2b direction, the outer lever 41 and the lever shaft 42 are rotated about the lever shaft axis in an arrow A3b direction.

(4) In FIG. 8, the inner lever 43 is turned integrally with the lever shaft 42 in the arrow A3b direction. In association with this, the shift shaft 50 and the spring holder 45 move in the arrow A4b direction (leftward) by virtue of the engaging pin 44 and the edge of the engagement groove 47.

(5) When the shift shaft 50 and the spring holder 45 move in the arrow A4b direction from the forward traveling high-speed position, the shift fork 51 also moves further in the arrow A4b direction of from the forward traveling high-speed position with the annular stopper 53 in between.

(6) In FIG. 7, in association with the movement of the shift shaft 50 in the arrow A4b direction (leftward), the first detent ball 110 and the second detent ball 210 escape upward from the high detent recesses 103 and 203, respectively. In this case, the second detent ball 210 can escape smoothly by virtue of being guided by the flat inclined surface on the right side of the high detent recess 203 for forward traveling high-speed.

(7) When the shift shaft 50, the spring holder 45, the shift fork 51, and the shift sleeve 90 move in the arrow A4b direction from the forward traveling high-speed position to the neutral position, the forward traveling dog claws 85 of the shift sleeve 90 escape from the high-speed dog claws 84 of the counter high gear 73. After that, the first detent ball 110 and the second detent ball 210 engage respectively with the neutral recesses 102 and 202.

[Shift from Forward Traveling Low-Speed State to Neutral State]

In FIG. 4, the shift lever 31 is turned or moved downward from the forward traveling low-speed position (L) through the forward traveling high-speed position (H) to the neutral position (N). The action for transmitting the shift operation force from the shift lever 31 to the shift shaft 50 shown in FIG. 7 and the action of the shift mechanism are basically similar to the action at the time of above-mentioned shift from the forward traveling high-speed position to the neutral position.

[Shift from Neutral State to Backward Traveling State]

(1) In FIG. 4, during the time that the vehicle is stopping, the driver turns the shift lever 31 downward from the neutral position (N) to the reverse position (R).

(2) In FIG. 3, when the shift lever 31 is turned in the arrow A1b direction from the neutral position (N) to the reverse position (R), the inner cable 25a of the push-pull cable mechanism 25 is pushed up in the arrow A2b direction (upward) in the inside of the outer cable 25b.

(3) In FIG. 5, in association with the movement of the inner cable 25a in the arrow A2b direction, the outer lever 41 and the lever shaft 42 are turned or rotated about the lever shaft axis in the arrow A3b direction.

(4) In FIG. 8, the inner lever 43 is turned integrally with the lever shaft 42 in the arrow A3b direction. In association with this, the shift shaft 50 and the spring holder 45 move integrally in the arrow A4b direction (leftward) by virtue of the engaging pin 44 and the edge of the engagement groove 47.

(5) In FIG. 7, when the shift shaft 50 and the spring holder 45 move in the arrow A4b direction (leftward), the shift fork 51 also moves in the arrow A4b direction with the stopper 53 in between.

(6) In association with the movement of the shift shaft 50 in the arrow A4b direction, the first detent ball 110 and the second detent ball 210 escape upward from the neutral detent recesses 102 and 202, respectively.

(7) When the shift shaft 50, the spring holder 45, the shift fork 51, and the shift sleeve 90 move in the arrow A4b direction from the neutral position to the reverse position, almost at the same time that the reverse dog claws 87 of the shift sleeve 90 engage with the reverse dog claws 86 of the counter reverse gear 76, the first detent ball 110 and the second detent ball 210 engage respectively with the reverse detent recesses 101 and 201.

(8) In the reverse state of the gear transmission 11, the first and the second detent balls 110 and 210 engage respectively with the reverse detent recesses 101 and 201 so as to be positioned and held.

(9) Further, in addition to the role of positioning and holding the shift shaft 50 at the reverse position, the second detent mechanism 200 plays also the role of smoothly guiding and pulling the shift shaft 50 into the reverse position. That is, at an early stage that the second detent ball 210 enters the reverse detent recess 201, the second detent ball 210 is smoothly guided and pulled to the deep bottom of the reverse detent recess 201 by the flat inclined surface on the left side of the reverse detent recess 201. Then, at last, when the first and the second detent balls 110 and 210 both engage with the reverse detent recesses 101 and 201, total of the spring loads (the pressing loads) of the detent springs 111 and 211 causes the shift shaft 50 to be held at the reverse position.

[Shift from Backward Traveling State to Neutral State]

(1) In FIG. 4, the shift lever 31 is turned from the reverse position (R) to the neutral position (N).

(2) In FIG. 3, when the shift lever 31 is turned in the arrow A1a direction from the reverse position (R) to the neutral position (N), the inner cable 25a of the cable mechanism 25 is pushed down in the arrow A2a direction of (downward) in the inside of the outer cable 25b.

(3) In FIG. 5, in association with the movement of the inner cable 25a in the arrow A2a direction, the outer lever 41 and the lever shaft 42 are turned or rotated about the lever shaft axis in the arrow A3a direction.

(4) In FIG. 8, the inner lever 43 is turned integrally with the lever shaft 42 in the arrow A3a direction. In association with this, the shift shaft 50 and the spring holder 45 move in the arrow A4a direction (rightward) by virtue of the engaging pin 44 and the edge of the engagement groove 47.

(5) When the shift shaft 50 and the spring holder 45 move in the arrow A4a direction from the reverse position, the shift fork 51 also moves in the arrow A4a direction from the reverse position with the coil spring 46 in between.

(6) In association with the movement of the shift shaft 50 in the arrow A4a direction, the first detent ball 110 and the second detent ball 210 escape respectively from the reverse detent recesses 101 and 201.

(7) When the shift shaft 50, the spring holder 45, the shift fork 51, and the shift sleeve 90 move in the arrow A4a direction from the reverse position to the neutral position, the reverse dog claws 87 of the shift sleeve 90 escape from the reverse dog claws 86 of the counter reverse gear 76. Then, the first detent ball 110 and the second detent ball 210 return respectively to the neutral recesses 102 and 202.

In the reverse shift operation, the waiting operation by the waiting mechanism 40 has an effect at the time of return from the reverse position to the neutral position.

[Effects of the Embodiment]

(1) The two detent mechanisms, which are the first detent mechanism 100 and the second detent mechanism 200, are provided in the shift device for the purpose that the shift shaft 50 moved and operated in the axial direction should be positioned and held at each of the neutral position, the forward traveling high-speed position, the forward traveling low-speed position, and the reverse position. Thus, the site for locking the shift shaft 50 can be distributed into two sites. This permits an increase in the total amount of the spring loads for pressing the shift shaft 50 without the necessity of a size increase in the speed change apparatus and with suppressing an increase in the shift operation force. Further, when the portion to be locked by the detent balls 110 and 210 is distributed, smoothness in the sliding of the shift shaft 50 is improved.

(2) The first detent mechanism 100 and the second detent mechanism 200 press both side portions in the axial direction of the shift shaft 50. Thus, even when the total spring load is increased, almost the entire length of the shift shaft 50 can be pressed almost uniformly without unevenness. Thus, sliding property of the shift shaft 50 is ensured.

(3) The plurality of detent recesses 101, 102, 103, 104, 201, 202, 203, and 204 of the detent mechanisms 100 and 200 are formed in the shift shaft 50 moving in the axial direction. Further, the detent balls 110 and 210 and the detent springs 111 and 211 are arranged in the transmission case 11a for supporting the shift shaft 50. This permits easy fabrication of the detent mechanisms 100 and 200.

(4) The shift fork 51 is arranged in the middle portion in the axial direction of the shift shaft 50. Then, the first detent mechanism 100 and the second detent mechanism 200 are separately arranged on both sides in the axial direction of the shift fork 51. Two sites in the shift shaft located on both sides in the axial direction of the shift fork 51 can be pressed and hence smooth moving action of the shift fork 51 is obtained during the operation.

(5) The first detent mechanism 100 and the second detent mechanism 200 are arranged in the same phase about the shift shaft axis. That is, the detent mechanisms 100 and 200 are both arranged at an upper position and hence press down the shift shaft 50 from above. This avoids chattering of the shift shaft 50 during the shift operation and hence ensures smooth sliding.

(6) Each of the detent recess 201, 203, and 204 of the second detent mechanism 200 has a flat inclined surface formed on both side portions or alternatively on the right or left side portion. Thus, at an early stage that the second detent ball 210 goes into engagement with the detent recess 201, 203, and 204 or alternatively at a stage of escaping, the second detent ball 210 is smoothly guided by the corresponding flat inclined surface. That is, despite that the two detent mechanisms are provided, smoothness in the sliding of the shift shaft 50 is maintained.

(7) In the first detent mechanism 100, the left end of the low detent recess 104 and the right end of the reverse dent recess 201 are slightly extended in the axial direction. Thus, at the time of shift to the forward traveling low-speed position and at the time of shift to the reverse position, an overstroke of the shift shaft 50 is ensured. In a configuration that the cable mechanism 25 is employed as the operation force transmission mechanism, in some cases, the stroke of shift lever operation is not sufficiently transmitted to the shift shaft 50. In such cases, the shift shaft 50 is caused to exceed the regular stroke so that complete engagement of the dog claws is ensured.

[Other Embodiments]

(1) The first detent mechanism and the second detent mechanism according to the above-mentioned embodiment have been arranged on the upper side of the shift shaft. However, in the present application, both detent mechanisms may be arranged on the lower side or the lateral side of the shift shaft. Further, the phases about the shift shaft axis of both detent mechanisms may be different from each other. For example, both detent mechanisms may be separately arranged on the upper side and the lower side or alternatively on the forward side and the backward side.

(2) The first detent mechanism and the second detent mechanism may be arranged in the end portion on the same side in the axial direction of the shift shaft. For example, the first detent mechanism may be arranged on the upper side of the right end portion of the shift shaft and the second detent mechanism may be arranged on the lower side of the right end portion of the shift shaft.

(3) In the above-mentioned embodiment, two detent mechanisms have been arranged. However, three or more detent mechanisms may be arranged. For example, a pair of detent mechanisms may be arranged in the right end portion of the shift shaft and one or a pair of detent mechanisms may be arranged in the left end portion.

(4) In the above-mentioned embodiment, the first detent spring and the second detent spring had mutually different spring loads. However, both detent springs may have spring loads of the same value. Further, the first detent ball of the first detent mechanism and the second detent ball of the second detent mechanism may have the same diameter.

(5) As for an operation force transmission mechanism, in addition to the above-mentioned push-pull cable type, the present technique is applicable also to a speed change apparatus employing an operation force transmission mechanism of rod type.

(6) Three or more detent mechanisms may be provided in the inside of gear transmission.

(7) The present technique is applicable also to a speed change apparatus whose shift lever device does not include a detent mechanism.

(8) As for the shift slot in the shift lever device, the present technique is applicable also to a speed change apparatus employing a shift panel provided with a shift slot having a shape other than the straight line shape like an E-shape, an H-shape, and other complicated shape.

(9) The present invention is not limited to the configuration of the embodiment and includes various kinds of modifications as long as not departing from the contents described in the claims.

What is claimed is:

1. A speed change apparatus of a vehicle, the speed change apparatus comprising:
    a gear transmission;
    a shift lever device arranged in a zone where an operation thereof is achievable from a driver's seat; and
    an operation force transmission mechanism for transmitting an operation force of the shift lever device to the gear transmission;
    wherein the gear transmission includes:
        a shift mechanism operated by the operation force so as to switch the gear transmission between a plurality of shift positions; and
        a plurality of detent mechanisms for positioning and holding the shift mechanism at each shift position, and
    wherein each of the detent mechanisms includes:
        a plurality of recesses formed in a movable member of the shift mechanism and corresponding respectively to the shift positions; and
        a detent member in a case member for supporting the movable member, the detent member being configured to engage with each recess by an elastic member.

2. The speed change apparatus according to claim 1, wherein:
    the movable member of the shift mechanism is a shift shaft supported by the case member so as to be movable in an axial direction of the shift shaft, the shift shaft having opposing side portions along the axial direction of the shift shaft, and
    the plurality of detent mechanisms are arranged at least in both side portions in the axial direction of the shift shaft.

3. The speed change apparatus according to claim 1, wherein:
    the movable member of the shift mechanism is a shift shaft supported by the case member so as to be movable in an axial direction of the shift shaft, and
    a shift fork is supported by the shift shaft while the detent mechanisms are arranged on both sides of the shift fork in the axial direction.

4. The speed change apparatus according to claim 1, wherein:
    the movable member of the shift mechanism is a shift shaft supported by the case member so as to be movable in the axial direction, and
    the detent members of the plurality of detent mechanisms are arranged approximately in the same phase in the circumferential direction of the shift shaft.

5. The speed change apparatus according to claim 2, wherein:
    the plurality of detent members are arranged on an upper side of the shift shaft.

6. The speed change apparatus according to claim 2, wherein:
    the elastic member of each of the detent mechanisms biases each detent member with an elastic load different from each other.

7. The speed change apparatus according to claim 1, wherein:
    the shift lever device includes:
        a shift lever turnable about a lever pivot; and
        a shift panel having a shift slot of approximately straight line shape where the shift lever passes.

* * * * *